Aug. 6, 1946.  J. DEAN  2,405,493
RADIO RANGE ORIENTATOR
Filed Nov. 2, 1943
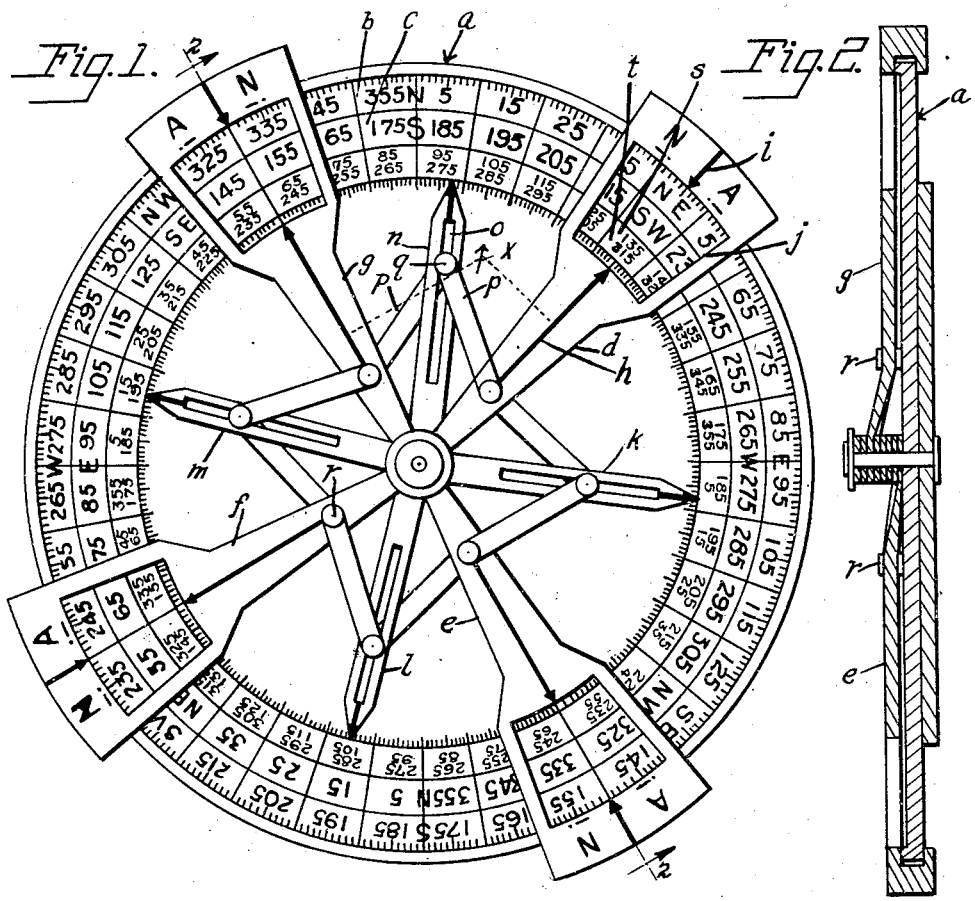
Inventor
John Dean
By Mason Fenwick & Lawrence
Attorneys Patented Aug. 6, 1946

2,405,493

UNITED STATES PATENT OFFICE 2,405,493

RADIO RANGE ORIENTATOR

John Dean, Harrisonburg, Va.

Application November 2, 1943, Serial No. 508,752

3 Claims. (Cl. 33—1)

This invention relates to a radio range orientator, having for its general object to assist a pilot flying by instruments, to locate a range station within whose field of range he may be flying, and determine any specific course with respect to said range station.

It is well understood by those skilled in the art that four beams radiate from a range station, dividing the range field into quadrants which may have equal angular amplitudes of 90°, or may have different angular amplitudes. The station broadcasts a station identification signal audible over all four quadrants, a code signal audible only in two opposite quadrants, and a complementary code signal audible only in the other two opposite quadrants. Thus, the code signal in one pair of opposite quadrants may be dot, dash, the Morse for A, while in the other pair the signal might be dash, dot, the Morse for N. On the beam, the dashes of each signal blanket the dots and a continuous monotone signal is audible.

Maps are published showing each range station with the location of the beams radiating therefrom, the identification signal of the station and the code signals for the respective pairs of opposite quadrants.

When a pilot is flying anywhere within the range field of a station on any course but not knowing his position, he is able to identify the station by the broadcast identification signal and he is then in a position to have recourse to a map of this particular station. If he is flying off the beam he hears one code signal, for instance, the letter A. He notes from this that he is in one of two opposite quadrants depicted on his map, but he does not know which one. He can tell from his map the headings of the beams, and from this data he computes the headings of the common bisector of the quadrants in one of which he knows he is flying, if they are true opposite angles, or in the event that the bisectors of these quadrants are not in a straight line he must compute the heading of an average bisector. Having done this he then sets his course to fly parallel to the computed bisector. If in flying this course the code signal fades, he knows that he is flying away from the station. If the signal builds, he knows he is flying toward the station. Thus, he is able to identify the particular quadrant in which he is flying.

Now, in order to get on either of the two beams which bound his quadrant, in the shortest time, he must fly a course perpendicular to the selected beam. Knowing from his map the heading of this beam, he can compute a course perpendicular thereto. In flying this course, approach to the beam is indicated by the faint audibility of the opposite code signal, which in this example would be the letter N from the adjacent quadrant, and when the beam is reached the two code signals merge into the monotone hum. It is at present the general practice for a pilot to overrun the beam when making a perpendicular approach thereto. He then flies beyond the beam for approximately one minute in order to give himself time to complete a 180° turn before again intersecting the beam. Upon again intersecting the beam he subtracts 25% from the original turn of 180°, which would give him a 135° turn. He then holds his new heading until he hears his off-course signal, at which time he again subtracts 25% from the preceding turn, which would be a turn of approximately 100°. He then continues to turn, reducing each turn by 25% until he has thus bracketed the beam down to the magnetic heading required to hold the on-course signal.

The mental calculations required in computing these several headings imposes a taxing strain upon the pilot, who is fully engrossed with the flying of his plane.

The device of the present invention provides a simple means for mechanically computing the headings essential for locating the position of the plane and putting it on the beam, and for mechanically computing the headings of the plane for the turns involved in bracketing the beam.

Other objects of the invention than those specifically described are within the purview of the invention.

In the drawing which accompanies and forms a part of the following specification, and throughout the several figures of which the same characters of reference have been employed to designate identical parts:

Figure 1 is a plan view of an orientator embodying the principles of the invention;

Figure 2 is a diagrammatical section taken along the line 2—2 of Figure 1.

Referring now in detail to the several figures, the reference character $a$ represents a disk of any suitable material such as plastic, having an outer circumferential scale $b$ graduated in the conventional manner from 0° to 360°. The cardinal and other points may be indicated by the usual designating letters, as shown.

Adjacent the outer scale $b$ is a circumferential scale $c$, similarly graduated but displaced 180° with respect to the scale $b$, so that it shows reciprocal heading graduations in radial juxtaposition to the heading graduations on the scale b.

Four arms d, e, f and g are independently pivotally mounted on the disk a concentrically to the scales b and c. These represent the four beams of a radio range, and are adjustable to any heading on the scales b or c. In use, the beam arms d, e, f and g are set to correspond to the beam headings derived from the published map of any particular range station.

For precision in setting, each beam arm may be provided with a radial linear index h, i, and a window j, overrunning the scales, by means of which heading graduations directly beneath the arms are unobscured.

Since pairs of opposite quadrants of the range are distinguished by code letters, such as a and n, having opposite code symbols . _ and _ . wherein the tones of each fill the silence intervals of the other when they equally interfere, providing a continuous tone, it is proposed to mark the opposite sides of the beam arm with the letters A and N and their respective code symbols, arranged as shown, so that similar code symbols are in apposition with respect to opposite sides of a quadrant, and in use the beam arms should be so set up with respect to the heading scales that the quadants designated as A and N will coincide with corresponding A and N quadrants on the map.

Intermediate the beam arms d, e, f and g, bisector arms k, l, m and n are provided pointing to the heading scales b and c, independently pivotally mounted concentric to said scales and so mechanically interconnected to adjacent beam arms as to maintain a halfway position between said beam arms throughout all variations of the quadrant angle embraced between said beam arms.

In the illustrated embodiment of the invention, the bisector arms are longitudinally slotted as at o and links p in pairs, are commonly interconnected at one end by pivots q, which play in said slots and which at their other ends are pivoted on a common axis r to the beam arms at opposite sides of the bisector arms. Other mechanical connections between the bisector and beam arms which maintain the bisector arms in mid position with respect to the quadrant angles are equivalent within the purview of the invention.

The disk a is provided adjacent the scales b and c with additional circumferential scales s and t concentric thereto and showing, in radial juxtaposition to the beam headings, the perpendicular headings in directions toward said beam from either side of the beam. Arbitrarily, the outer of the perpendicular heading scales shows the headings of courses perpendicular to the beams in a clockwise direction, while the inner of said scales shows the headings of perpendicular courses toward the beams in a counter-clockwise direction.

One of the uses of this orientator is exemplified as follows:

The pilot flying by instruments hears the identification signal of a range station and also a quadrant code signal from this station. He refers to his map of this station and sets the beam arms of his orientator to correspond to the beam headings of the map. When he does this, the bisector arms automatically maintain a midposition in the respective angles of the quadrants. In this particular example, as illustrated in Figure 1, the quadrants are not all angles of 90°. Therefore, opposite bisectors will not be in the same straight line. However, they are so nearly in alignment that he can select the heading of either, or an average heading, as the datum for his quadrant identifying flight.

Assuming that he heard the code N signal, and therefore knows that he is in either of the N quadrants, and that he selects average of the heading of bisector N, Figure 1, and the reciprocal heading of bisector L, which is half the sum of 7½° and 15°, or 11¼°. He flies on this heading, 11¼° east of north, and finds that the signals weaken. He knows from this that he is in the upper quadrant in Figure 1. Had the signals built, he would have known himself to be in the lower quadrant. Had he flown on the reciprocal average heading, as shown on the orientator, he would still have known by the build of the signals that he was in the upper quadrant.

Assuming that he is off the beam when he identifies his quadrant, for example, in the position shown by the arrow x, in Figure 1, unless he is close enough to one of the beams to hear the opposite faint background signal from the adjacent quadrant on the other side of the beam, he has no knowledge as to which beam is closer to his position, so he has the blind option of flying toward either of the beams which bound his quadrant. He glances at the perpendiculars scale under the heading of the righthand beam, upper figure, since the beam is clockwise with respect to his position, and finds the heading graduation 135°. He puts his plane on this heading and flies a course perpendicular to the righthand beam; or he may decide on the lefthand beam. He glances at the perpendiculars scale under the heading of the lefthand beam, lower figure, since the beam is counterclockwise of his position, and finds the heading graduation 240°. He puts his plane on this heading, which brings him perpendicular to the beam.

He knows his close approach to the beam by the looming of the on-course background signal, and he knows when he is at the beam by the composition of opposite signals into a continuous monotone hum.

While I have in the above description disclosed what I believe to be preferred and practical embodiment of the invention, it will be understood to those skilled in the art that the details of construction and the arrangement of parts as shown and described are by way of example, and not to be construed as limiting the scope of the invention as defined in the appended claims.

What I claim as my invention is:

1. Radio beam orientator comprising a disk having a circumferential scale of compass headings thereon, and plurality of beam heading indicating arms pivotally mounted on said disk concentric to said scale, independently movable and adapted to be set with reference to said scale to correspond to beam headings of a range station, derived from a map, bisector heading indicating arms intermediate said beam heading indicating arms, independently pivoted concentric to said scale and movable in juxtaposition thereto, and means so interconnecting said bisector heading indicating arms to adjacent beam heading indicating arms as to maintain the bisecting relation of said bisector heading indicating arms with respect to the angles between said beam heading indicating arms.

2. Radio beam orientator comprising a disk having a first circumferential scale of compass headings thereon and a second concentric circumferential scale of compass headings, the second scale being arranged with the compass headings of courses in both directions perpendicular to a heading of the first scale, in radial alignment with said heading, a plurality of beam heading indicating arms pivotally mounted on said disk concentric to said scale, independently movable and adapted to be set with reference to said first scale to correspond to beam headings of a range station, derived from a map, bisector heading indicating arms intermediate said beam heading indicating arms independently pivoted concentric to said scales and movable in juxtaposition thereto, and means so interconnecting said bisector heading indicator arms to adjacent beam heading indicating arms as to maintain the bisecting relation of said bisector heading indicating arms with respect to the angles between said beam heading indicating arms.

3. Radio beam orientator comprising a disk having a first circumferential scale of compass headings thereon and a second concentric circumferential scale of compass headings, the second scale being arranged with compass headings of courses in both directions perpendicular to a heading of the first scale, in radial alignment with said heading, a plurality of beam heading indicating arms pivotally mounted on said disk concentric to said scale, independently movable and adapted to be set with reference to said first scale to correspond to beam headings of a range station, derived from a map, bisector heading indicating arms intermediate said beam heading indicating arms independently pivoted concentric to said scales and movable in juxtaposition thereto, said bisector heading indicating arms each being longitudinally slotted, and links of equal length in pairs, one pair for each bisector heading indicating arm, commonly pivoted at one end to a pivot which is movable longitudinally in the slot in said bisector heading indicator arm and pivoted at their opposite ends to adjacent beam heading indicating arms, whereby said bisector heading indicating arms maintain their bisecting relation with respect to the angles between said beam heading indicating arms.

JOHN DEAN.